US 6,732,927 B2

(12) United States Patent
Olsson et al.

(10) Patent No.: US 6,732,927 B2
(45) Date of Patent: May 11, 2004

(54) METHOD AND DEVICE FOR DATA DECODING

(75) Inventors: Andreas Olsson, Lund (SE); Mats Petter Petterson, Lund (SE)

(73) Assignee: Anoto AB, Lund (SE)

( * ) Notice: Subject to any disclaimer, the term of this patent is extended or adjusted under 35 U.S.C. 154(b) by 0 days.

(21) Appl. No.: 10/179,263

(22) Filed: Jun. 26, 2002

(65) Prior Publication Data

US 2003/0012455 A1 Jan. 16, 2003

Related U.S. Application Data

(60) Provisional application No. 60/302,358, filed on Jul. 3, 2001.

(30) Foreign Application Priority Data

Jun. 26, 2001 (SE) .............................................. 0102255

(51) Int. Cl.$^7$ ................................................. G06K 7/10
(52) U.S. Cl. ............... 235/454; 235/462.1; 235/462.08; 235/494
(58) Field of Search .............................. 235/454, 462.1, 235/462.08, 494

(56) References Cited

U.S. PATENT DOCUMENTS

| | | | | |
|---|---|---|---|---|
| 5,221,833 A | * | 6/1993 | Hecht | ......................... 235/494 |
| 5,245,165 A | | 9/1993 | Zhang | |
| 5,449,895 A | * | 9/1995 | Hecht et al. | ................. 235/494 |
| 5,449,896 A | * | 9/1995 | Hecht et al. | ................. 235/494 |
| 5,453,605 A | * | 9/1995 | Hecht et al. | ................. 235/494 |
| 5,521,372 A | * | 5/1996 | Hecht et al. | ................. 235/494 |
| 5,852,434 A | | 12/1998 | Sekendur | |
| 5,898,166 A | * | 4/1999 | Fukuda et al. | ............... 235/494 |
| 6,182,901 B1 | * | 2/2001 | Hecht et al. | ................. 235/494 |

FOREIGN PATENT DOCUMENTS

| | | |
|---|---|---|
| SE | 0103589-8 | 10/2001 |
| SE | 0104088-0 | 12/2001 |
| WO | WO 00/73983 | 12/2000 |
| WO | WO 01/26032 A1 | 4/2001 |
| WO | WO 01/26033 A1 | 4/2001 |
| WO | WO 01/26034 A1 | 4/2001 |
| WO | WO 01/30589 A1 | 5/2001 |
| WO | WO 01/71653 A1 | 9/2001 |
| WO | WO 01/75783 A1 | 10/2001 |

* cited by examiner

*Primary Examiner*—Michael G. Lee
*Assistant Examiner*—Kimberly Nguyen
(74) *Attorney, Agent, or Firm*—Birch, Stewart, Kolasch & Birch, LLP

(57) ABSTRACT

A method is provided for decoding data stored in a partial area of a coding pattern on a surface, based on a recorded image of the partial area. The coding pattern contains elements which each have at least two possible decoding values. The method identifies in the image a plurality of elements. The method further calculates, for each identified element, an associated value probability for each possible decoding value that the element has this decoding value. Additionally, the method performs the decoding of data based on the decoding values and the corresponding value probabilities. A device and a memory medium storing a computer program with instructions for performing such a data decoding technique are also provided.

37 Claims, 11 Drawing Sheets

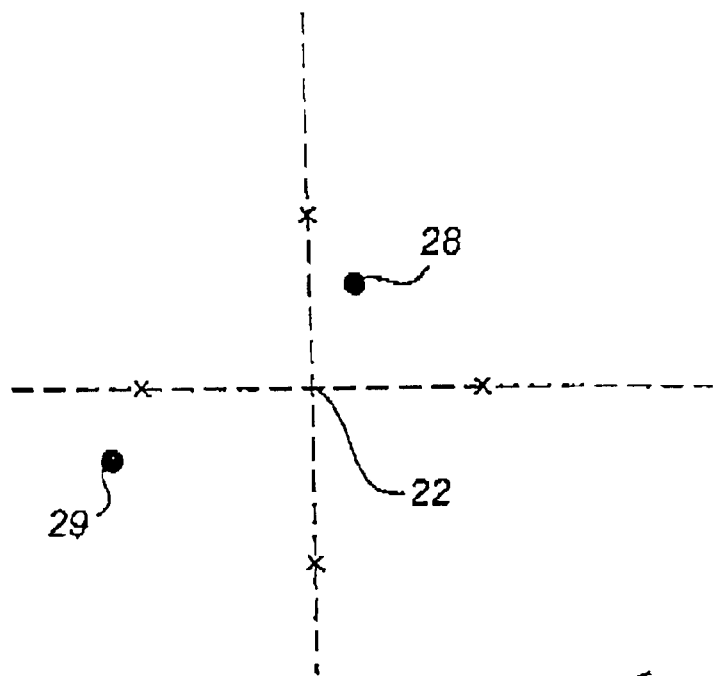

| Element value | $P_2$ | Bit comb. |
|---|---|---|
| "0" | 0,26 | 0,1 |
| "1" | 0,45 | 0,0 |
| "2" | 0,57 | 1,0 |
| "3" | 0,19 | 1,1 |
33
| "0" | 0,26 | 0 |
|---|---|---|
| "1" | 0,45 | 0 |
| "2" | 0,57 | 1 |
| "3" | 0,19 | 1 |
33'
| "0" | 0,26 | 1 |
|---|---|---|
| "1" | 0,45 | 0 |
| "2" | 0,57 | 0 |
| "3" | 0,19 | 1 |
33"
Fig. 7a
max(0.26, 0.45) = 0.45
max(0.57, 0.19) = 0.57
max(0.45, 0.57) = 0.57
max(0.26, 0.19) = 0.26
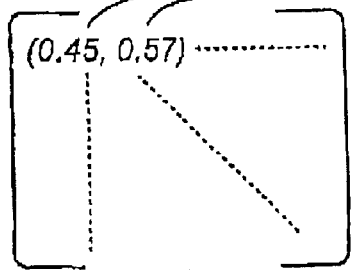
(0.45, 0.57)
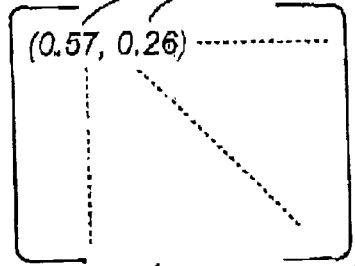
(0.57, 0.26)
Fig. 7b
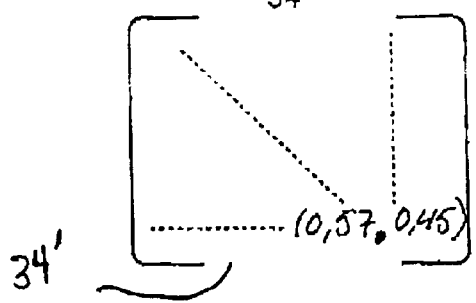
34 / 34'
(0.57, 0.45)
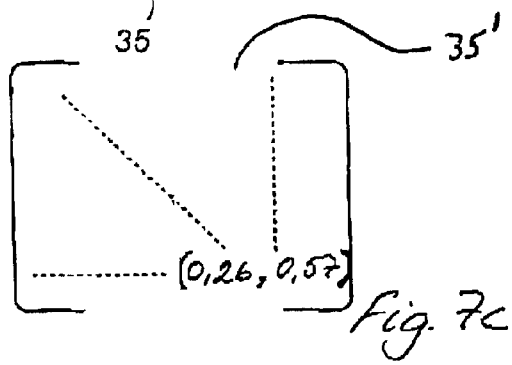
35 / 35'
(0.26, 0.57)
Fig. 7c

| 36 | 37 | |
|---|---|---|
| 0 | 0.11, 0.37 | 0.11 |
| 1 | 0.08, 0.53 | 0.53 |
| 0 | 0.84, 0.57 | 0.84 |
| 0 | 0.21, 0.25 | 0.21 |
| 1 | 0.62, 0.91 | 0.91 |
| 1 | 0.38, 0.06 | 0.06 |
| 0 | 0.64, 0.42 | 0.64 |
| 1 | 0.04, 0.17 | 0.17 |

$= 6{,}11 \cdot 10^{-5}$

38

[000000100111101 0 . . . . . ]

39

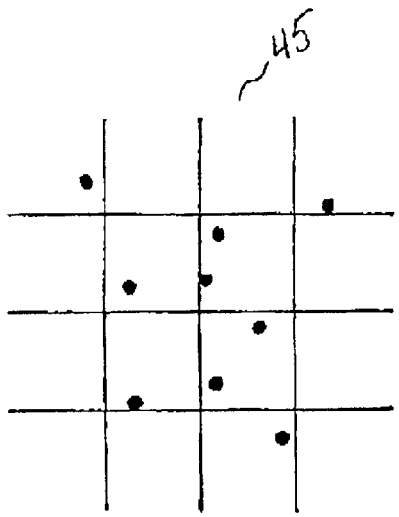
$$46 \sim \begin{bmatrix} (0.45, 0.27) & (0.31, 0.41) & (0.73, 0.09) \\ (0.36, 0.14) & (0.73, 0.09) & (0.16, 0.47) \\ (0.72, 0.09) & (0.55, 0.12) & (0.12, 0.55) \end{bmatrix}$$
$$47 \sim \begin{bmatrix} (0.45, 0.15) & (0.15, 0.41) & (0.11, 0.73) \\ (0.36, 0.36) & (0.73, 0.11) & (0.47, 0.24) \\ (0.12, 0.72) & (0.55, 0.22) & (0.22, 0.55) \end{bmatrix}$$
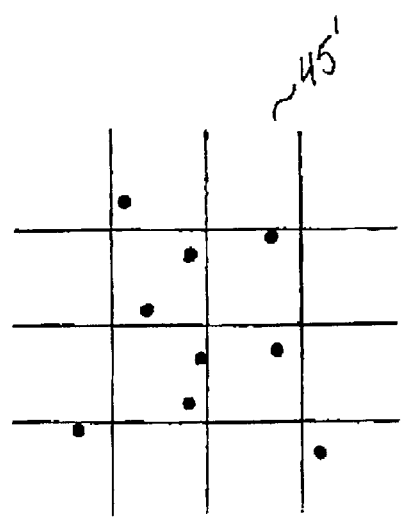
$$48 \sim \begin{bmatrix} (0.55, 0.12) & (0.12, 0.55) & (0.09, 0.72) \\ (0.47, 0.16) & (0.09, 0.73) & (0.14, 0.36) \\ (0.09, 0.73) & (0.41, 0.31) & (0.27, 0.45) \end{bmatrix}$$
$$49 \sim \begin{bmatrix} (0.55, 0.22) & (0.22, 0.55) & (0.72, 0.12) \\ (0.24, 0.47) & (0.11, 0.73) & (0.36, 0.36) \\ (0.73, 0.11) & (0.41, 0.15) & (0.15, 0.45) \end{bmatrix}$$
Fig. 11

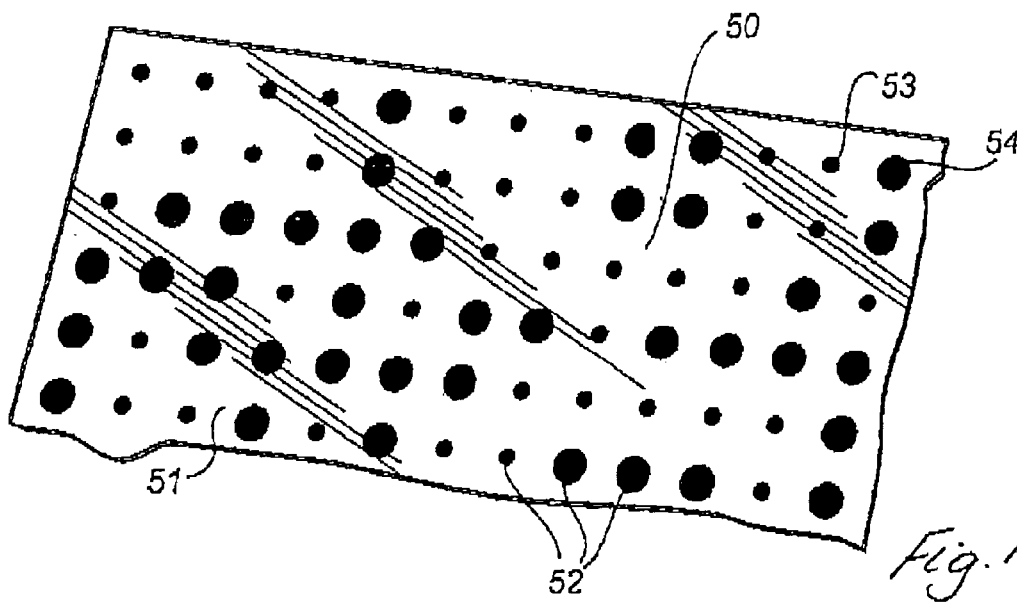
Fig. 12
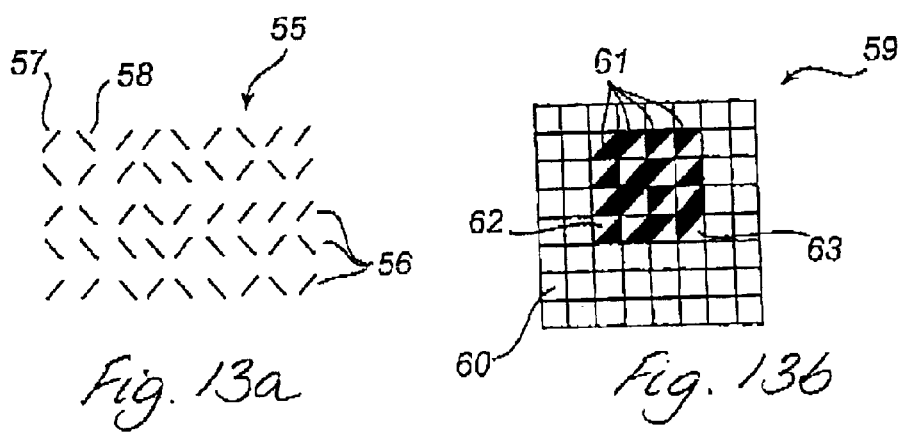
Fig. 13a
Fig. 13b

METHOD AND DEVICE FOR DATA DECODING

CROSS REFERENCE TO RELATED APPLICATIONS

This application claims priority under 35 U.S.C. §119 of U.S. Provisional Application No. 60/302,358, entitled "Method for Position Determination" and filed Jul. 3, 2001, the entire contents of which are incorporated herein by reference. This application also claims priority under 35 U.S.C. §119 of Swedish Application 0102255-7, filed Jun. 26, 2001, the entire contents of which are herein incorporated by reference.

FIELD OF THE INVENTION

The present invention relates to a method for data decoding, and more particularly to a method which decodes data stored in a partial area of a coding pattern on a surface, based on a recorded image of the partial area, the coding pattern containing elements which each have at least two possible decoding values. The invention also relates to a device for data decoding, and more particularly to a data decoding device having a processing unit for decoding data which is stored in a partial area of a coding pattern on a surface. Moreover the invention relates to a memory medium on which is stored a computer program with instructions which, when executed by a processor, perform a method for data decoding based on an image. The invention also relates to a method of data decoding which performs decoding using probability calculations based on an image of a coding pattern.

BACKGROUND ART

In many situations it is desirable to be able to decode data stored in coded form on a product. One example of such data decoding is to determine the position on a surface provided with a coding pattern. Such position determination is useful, for instance, when using a reading pen on a writing surface.

Applicant's Patent Publication WO 01/26032, which is herewith incorporated by reference, describes a device for position determination and a product that has a surface that is provided with a coding pattern. The device is arranged to record an image of the surface, to locate a predetermined number of symbols in the image, to determine the value of each of the symbols and to determine its position on the surface based on these values.

There are many other types of coding patterns in the form of position codes, for example, those in which each position is coded by a complex symbol with a special appearance.

A problem in decoding the known types of coding patterns is that the values of the symbols cannot always be determined with full accuracy. When the coding pattern is printed on a surface, the limited resolution of printers may imply that the symbols are not printed completely exactly. The symbols can, for example, be printed somewhat deformed or somewhat displaced from their "nominal" location. If it is the shape or location of the symbol that determines its value, the deformation and the displacement, respectively, mean that it may be difficult to determine the value of the symbol unambiguously.

It sometimes also happens that a symbol is not printed at all.

Another problem may arise if the coding pattern is printed on a surface that has a structure of its own that can interfere with the location of symbols in the recorded image. Structures in the surface can then be perceived as symbols by a device for data decoding. It can also happen that there are impurities, for instance in the form of dust, on the surface on which the coding pattern is printed. These impurities may give rise to noise symbols in the recorded image. Such noise symbols may then by mistake be identified as symbols in the coding pattern. Also, sensor noise from a sensor for recording the image may cause noise symbols in the image. Noise symbols in the recorded image may also originate from a defect on one of the components in the device, for instance damaged pixels in the sensor. On account of the above reasons there is therefore a risk that data cannot be decoded from the coding pattern in a recorded image.

SUMMARY OF THE INVENTION

According to a first aspect, the present invention relates to a method for decoding of data. The method according to this aspect of the invention decodes data stored in a partial area of a coding pattern on a surface, based on a recorded image of the partial area. The coding pattern contains elements, which each have at least two possible decoding values. The method identifies in the image a plurality of such elements, calculates, for each identified element, an associated value probability for each possible decoding value that the element has this decoding value, and decodes data based on the decoding values and the corresponding value probabilities.

For the reasons discussed above, the coding pattern on a surface, and/or the imaging of the same, is usually not completely perfect. One single decoding value for an element can usually not be determined with complete certainty as there is a possibility that the element has another of the possible decoding values. According to an aspect of the invention, for each element and for each of the decoding values, a value probability is therefore calculated that the element has that decoding value. If an element is determined unambiguously, then the value probability that corresponds to the unambiguously determined decoding value of the element will be maximum, while the other value probabilities for the element are zero. The more uncertain the decoding value of an element, the less difference there is between its value probabilities. If an element is missing in one place in the coding pattern, the value probabilities for the element will therefore be equally high. The present invention thus enables a relatively robust decoding of the coding pattern.

In the recorded image, more than a predetermined number of elements that are required for decoding of data may be identified according to one exemplary implementation of the present invention. The predetermined number of elements which may contribute most information in decoding can therefore be selected. As stated above, these elements are those having a dominating value probability for one of the decoding values. Consequently the chance increases that data can be decoded based on the recorded image since an element contributing little information can be sorted out.

The method may further comprise decoding at least a first set of decoding values for the predetermined number of identified elements.

The method may further comprise calculating sequence probabilities for a sequence of elements in the recorded partial area in the image. For instance, if the predetermined number of identified elements is a matrix, the sequence of elements can be the elements in a column or row in the matrix. The sequence probabilities can be calculated based on the value probabilities for the decoding values in the first set that correspond to the elements in the sequence. A value probability can be calculated for each of a plurality of a permissible combinations of decoding values. For each element, each of the possible decoding values corresponds to a value probability. The sequence probability for a combination may be determined based on the value probabilities for the decoding values which constitute the combination. In the same way as a value probability for an element corresponds to the element having the corresponding element value, a sequence probability for a sequence of elements corresponds to the sequence consisting of the corresponding combination. Of course, there are other ways than that described above in which sequence probabilities can be calculated.

The method may comprise selecting one of the possible decoding values for each of the elements which correspond to the first set of decoding values. The selection can be made based on a condition, given by the coding pattern, for the relation between the decoding values of the elements. The condition conveniently indicates which combinations of decoding values may exist among the elements in the coding pattern in the recorded image. In other words, the condition is given by how the used coding pattern is made up. The condition for existing combinations can be given at a global level, i.e., seen over all elements in the image, or at a local level, i.e., over an ensemble of elements in the image, for instance by columns and/or rows. Probability calculations are used to combine the information in the image, corresponding to the condition, so that the decoding values of the elements can be selected based on the probability calculations, within the scope of the condition.

The condition may indicate the above-discussed permissible combinations of decoding values.

Coding patterns that are used in connection with the present invention can usually be recorded "from more than one direction". This means that the coding pattern in the recorded image can be rotated in different ways. The result of a decoding of data may depend upon the rotation of the coding pattern. For this reason, the method according to the invention may comprise carrying out the decoding based on rotation probabilities. The rotation probabilities correspond to different rotations or orientations of the recorded image, i.e., different rotations of the coding pattern. For each of the different rotations of the image, a rotation probability can be calculated. This can be done based on the sequence probabilities or value probabilities of the decoding values for the identified elements. Then data may be decoded based on the rotation of the coding pattern which gives the highest rotation probability. This step implies that the decoding of data is not affected by a device according to the invention being rotated in relation to the surface during the position determination.

According to a second aspect, the invention relates to a device for data decoding. The data decoding device according to this aspect of the invention includes a processing unit for decoding data which is stored in a partial area of a coding pattern on a surface, based on a recorded image of the partial area. The coding pattern contains elements, which each have at least two possible decoding values. The device is arranged to identify in the image a plurality of such elements, calculate for each identified element an associated value probability for each possible decoding value that the element defines this decoding value, and carry out decoding of data based on the decoding values and the corresponding value probabilities.

The image can be recorded by a sensor. The sensor can be integrated with the device for data decoding or be positioned in a separate unit, from which the device receives the recorded image.

According to a third aspect, the invention relates to a memory medium on which is stored a computer program with instructions which, when executed by a processor, perform a method for data decoding, based on an image.

According to a fourth aspect, the invention relates to a method of data decoding which performs decoding using probability calculations based on an image of a coding pattern.

Aspects of the present invention can be implemented as a computer program which is stored in the memory of the device and executed in the processor of the device or in an external device. Alternatively, the method can be implemented completely or partially in the form of an application-specific circuit, such as an ASIC, or in the form of digital or analog circuits or of some suitable combination thereof.

The features that are discussed in this application in connection with the disclosed data decoding technique are of course applicable to a method, a device and a memory medium according to the invention.

The features described in this application can of course be combined in the same embodiment.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

Further aspects, features, and advantages of the invention will become apparent from the detailed description given below with reference to the accompanying drawings, which are incorporated in and constitute a part of the specification and, together with the description, explain the features and principles of the invention. In the drawings:

FIG. 3b shows an enlargement of part of the coding pattern in FIG. 3a.

FIGS. 6a–6c show, by way of example, how value probabilities for an element may be calculated consistent with principles of the present invention.

FIGS. 7a–7c illustrate, by way of example, the creation of a first and a second matrix consistent with principles of the present invention.

FIG. 11 illustrates exemplary rotation of a coding pattern consistent with principles of the present invention.

FIG. 12 shows an exemplary second type of coding pattern consistent with principles of the present invention.

FIGS. 13a–13b show two more examples of coding patterns consistent with principles of the present invention.

DETAILED DESCRIPTION OF THE INVENTION

Figure 1:
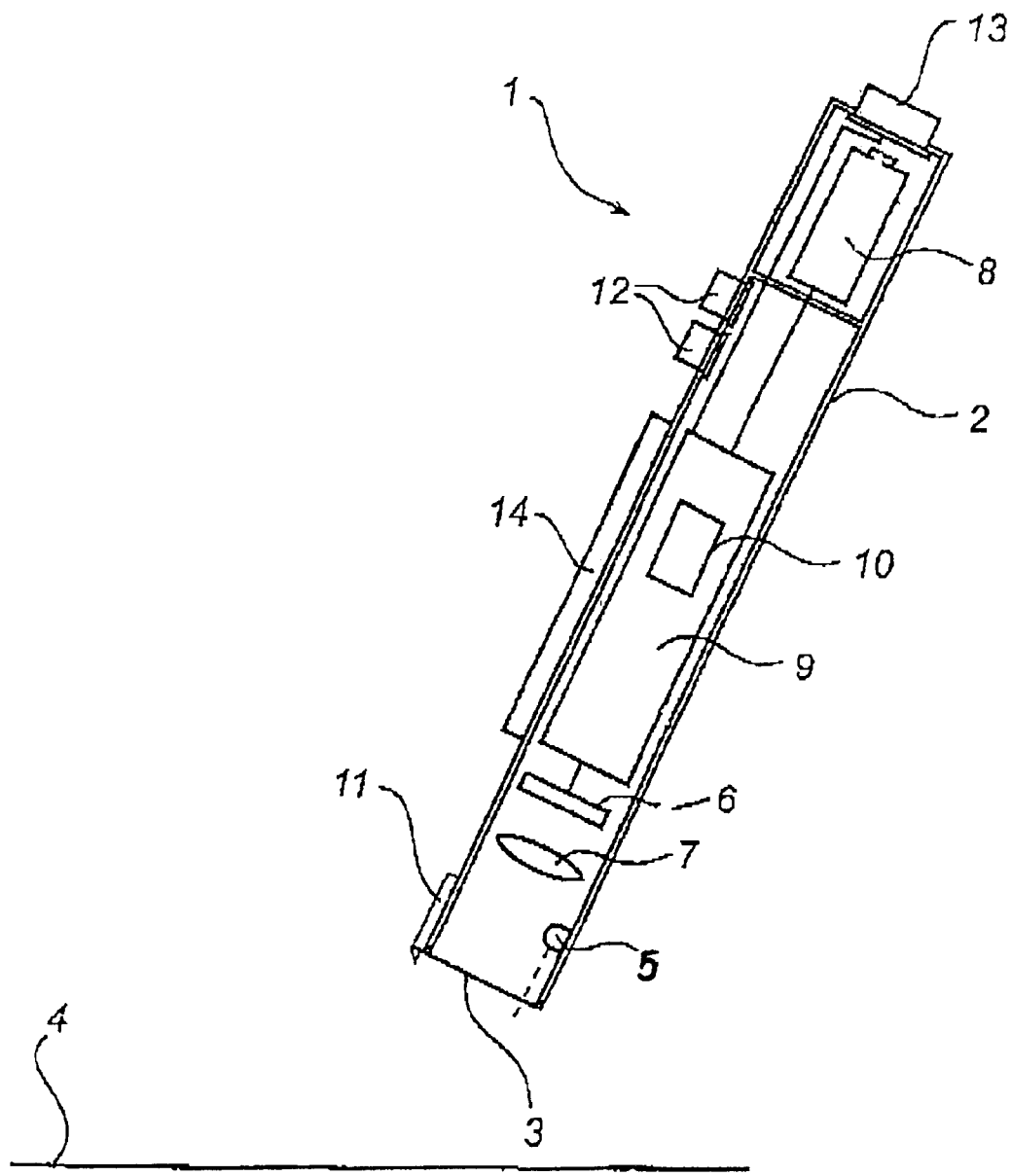
FIG. 1 shows an exemplary device for data decoding consistent with principles of the present invention.

FIG. 1 shows an exemplary device 1 for data decoding consistent with principles of the present invention. In this example, the device 1 is used to decode or determine a position. In this case data is more specifically two coordinates defining a position. The device comprises a casing 2 which is approximately of the same shape as a pen. In the lower side of the casing there is an opening 3. The lower side is intended to abut against or to be held a short distance from a surface 4, which is provided with a coding pattern (not shown) which stores data to be decoded. The device 1 comprises at least one light-emitting diode 5 for illuminating the surface 4, and a light-sensitive area sensor 6, for example a CCD or CMOS image sensor, for recording a two-dimensional digital image of a partial area of the coding pattern on the surface 4. Optionally, the device 1 can also contain a lens system 7.

The power supply for the device 1 is obtained from a battery 8, which is mounted in a separate compartment in the casing 2.

The device 1 further comprises image-processing means 9 for determining the position on the basis of the image recorded by the sensor 6 and, more specifically, a processor unit 10 which is programmed to record images from the sensor 6 and to carry out position determination on the basis of these images.

In this example, the device 1 also comprises a pen point 11, by means of which ordinary pigment-based writing can be written on the surface 4. The pen point 11 can be extendable and retractable so that the user can control whether or not it is to be used. In certain applications, the device does not need to have a pen point at all.

The device 1 can further comprise buttons 12, by means of which the device can be activated and controlled. It can also comprise a transceiver 13 for wireless transmission, for example using infrared light or radio waves, of information to and from the device, and a display 14 for displaying information based on decoded data.

Figure 2:
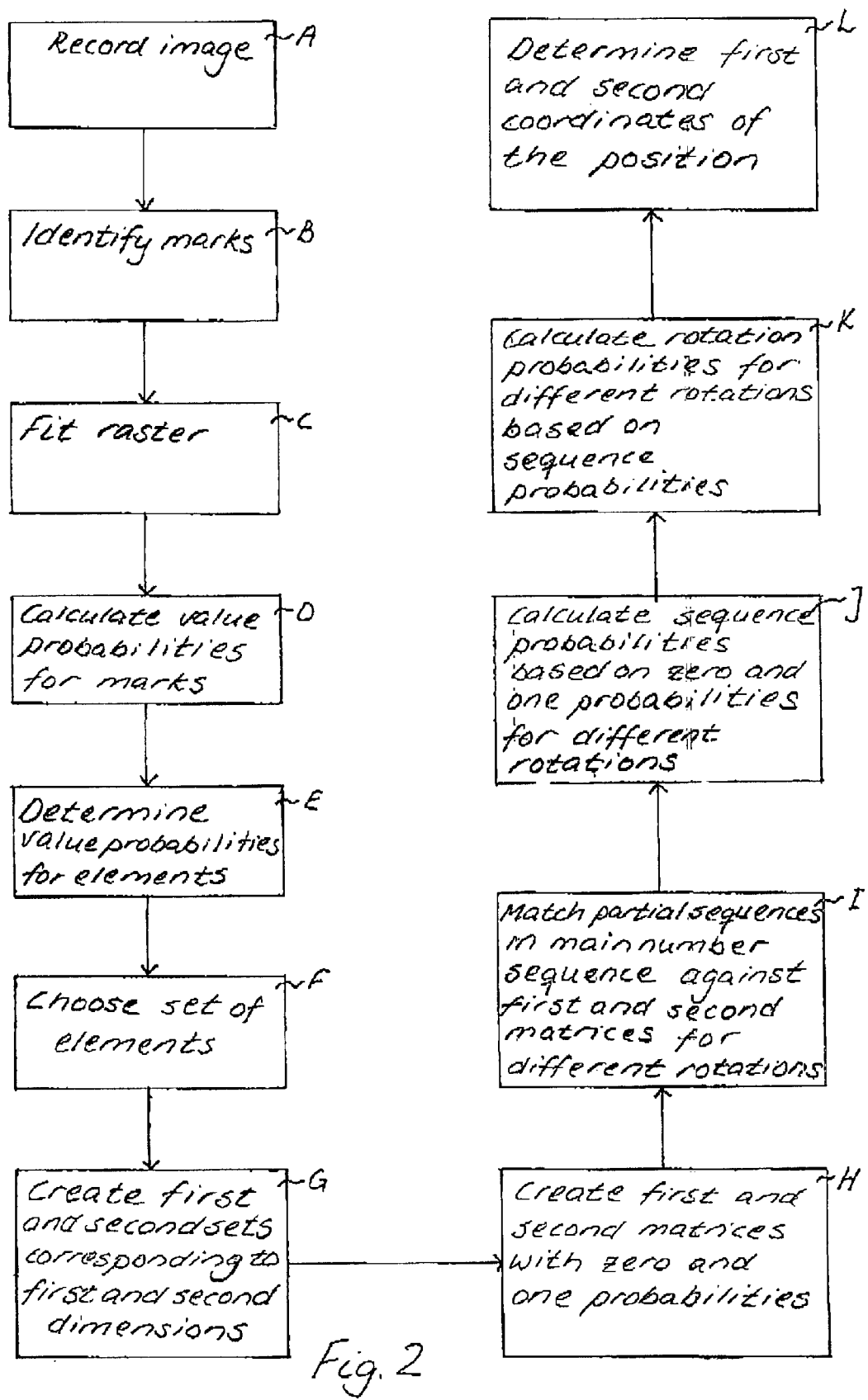
FIG. 2 shows a flow chart describing a decoding example consistent with principles of the present invention.

Now follows a description, with reference to the flow chart in FIG. 2, of an example of how a coding pattern can be decoded by means of probability calculations. The coding pattern to be decoded in this example is of the type described in Applicant's WO 01/26032.

Figure 3A:
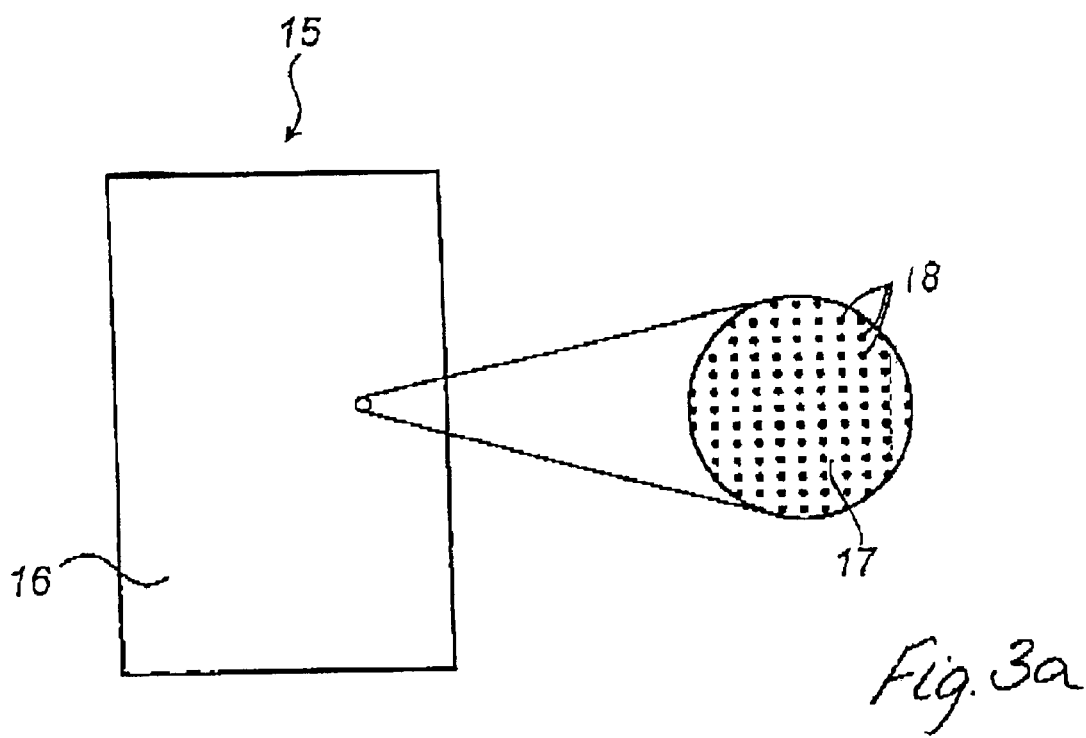
FIG. 3a shows an exemplary sheet of paper provided with a first type of coding pattern.
Figure 3B:
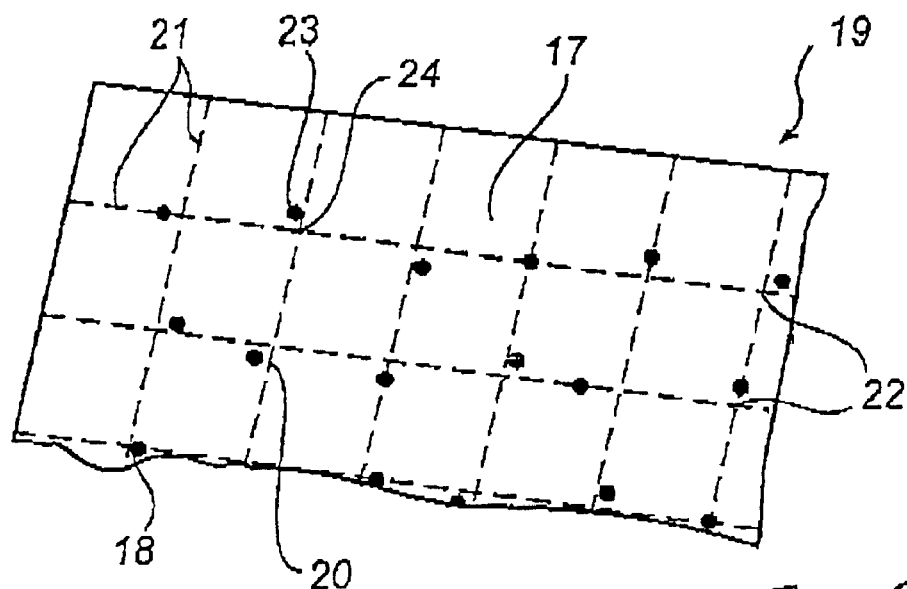

FIG. 3a shows an exemplary sheet of paper 15 that has a surface 16 that is provided with a coding pattern in the form of an optically readable position code 17. The position code consists of marks 18 and is greatly enlarged for the sake of clarity. FIG. 3b shows a further enlarged part 19 of the position code 17 in FIG. 3a. The device is arranged to record an image of a partial area of the position code (step A), to identify a plurality of marks 18 in the image (step B) and to fit to the image a reference system in the form of a raster (step C) with raster lines 21 that intersect at raster points 22. The fitting is carried out in such a way that each of the marks 18 is associated with a raster point 22. For example, the mark 23 is associated with the raster point 24. Consequently the raster fitting makes it possible to determine to which raster point each mark belongs. In this example, the raster has the form of a square grid, but also other forms are possible. Applicant's Applications WO 01/75783, WO 01/26034 and SE 0104088-0, which are herewith incorporated by reference, disclose in more detail fitting of a raster to marks in an image.

In the "ideal" coding pattern, one and only one mark is associated with each raster point. Owing to deformations and deficiencies in the imaging of the coding pattern, it may be difficult to determine in an image of the coding pattern which marks belong to the coding pattern and which of a plurality of marks is the one that is to be associated with a certain raster point. For this reason, it is possible to associate in this example a plurality of marks with one and the same raster point in the decoding of data. The marks associated with a raster point together form an element belonging to the raster point.

Figure 4:
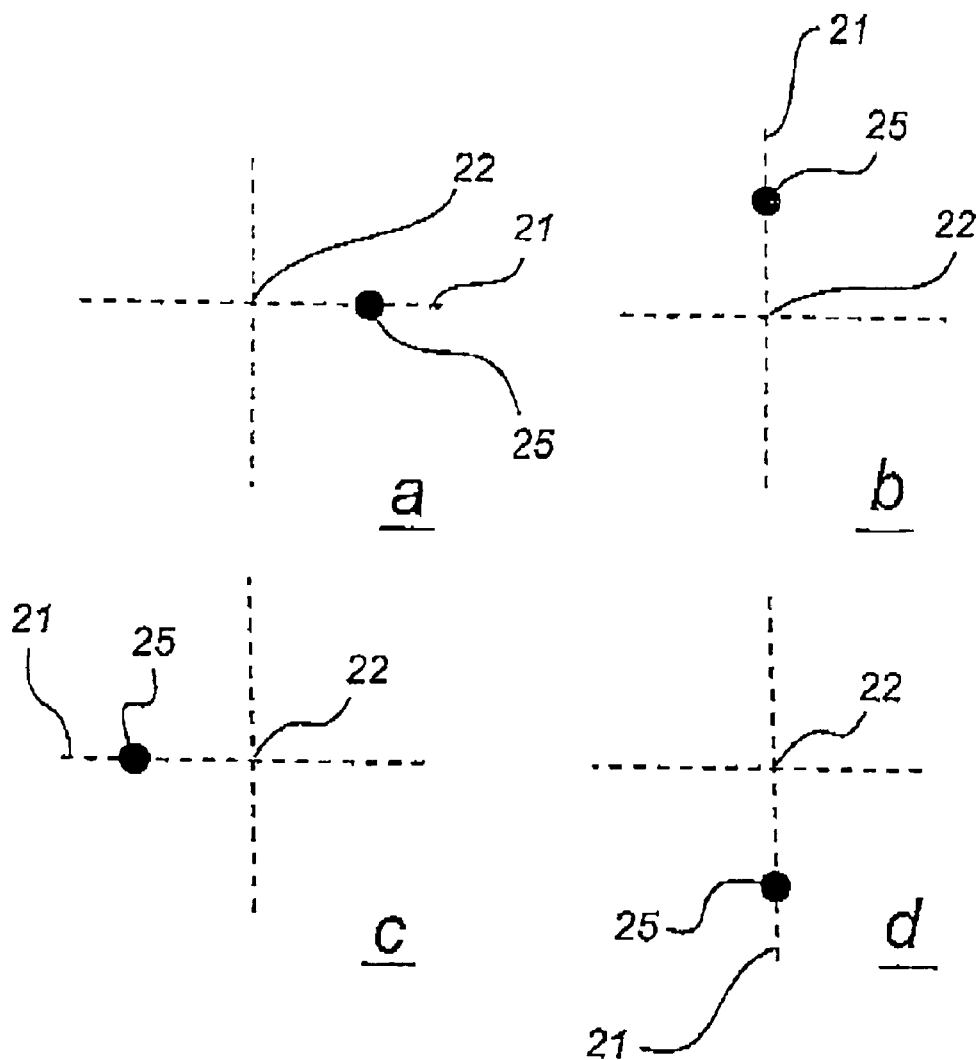
FIGS. 4a–4d show four ideal locations of a mark in an exemplary coding pattern consistent with principles of the present invention.

In the coding pattern in this example, the value of the marks 18 is defined by their displacement in relation to the raster points 22 with which they are associated. More specifically, it is the position of a point of a mark relative to a raster point that defines the value of the mark. This point is typically the main point of the mark. In the coding pattern in this example, there are four ideal locations for each mark. These locations are on each of the four raster lines 21 extending from the raster point 22 with which the mark is associated. The locations are situated at an equal distance from the raster point. The ideal locations 25 for a mark are shown enlarged in FIGS. 4a–d. They have the value "0" in FIG. 4a, the value "1" in FIG. 4b, the value "2" in FIG. 4c and the value "3" in FIG. 4d. Each mark can thus represent four different values "0-3".

Figure 5:
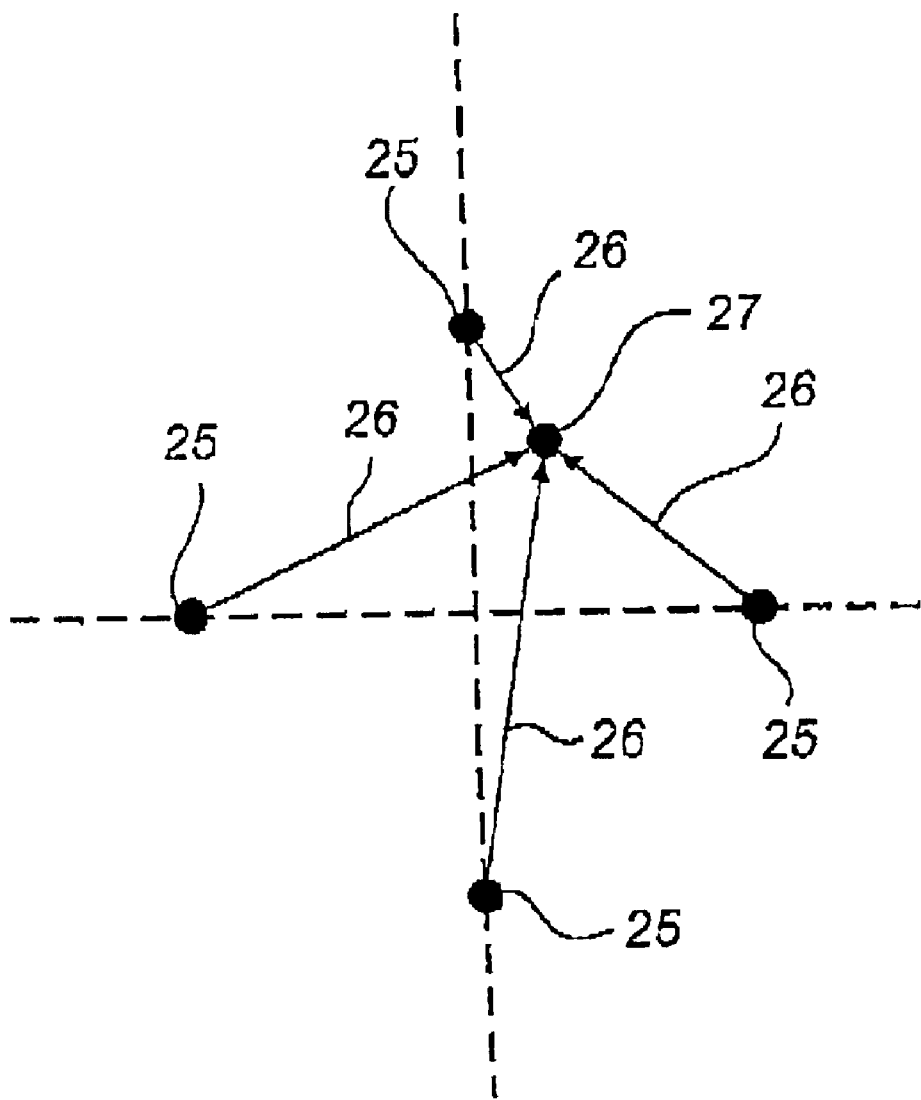
FIG. 5 shows, by way of example, how value probabilities for a mark may be calculated consistent with principles of the present invention.

For various reasons, the marks identified in the recorded image often do not have an ideal location. In many cases it can therefore be difficult to unambiguously determine one value for a mark. Because of this, the device is arranged to calculate, for each identified mark, an associated value probability for each value "0-3" that the mark defines this value (step D). The value probabilities for each mark are a decreasing function of the distances 26 from the mark 27 to each of its ideal locations 25, see FIG. 5, or more specifically, typically from the main point of the mark 27 to each ideal location. The marks can be assumed to be normally distributed around the ideal locations. This means that the value probabilities, $P(d_i)$, can be calculated by the formula $P(d_i)=k \exp(-(d_i)^2/v)$, where k=a constant, $d_i$=the distance from a mark to an ideal location and v=a constant, in this example the variance of the distance. The variance can be determined empirically. Four value probabilities can thus be calculated for each mark. It sometimes happens that a mark is found in the center of a raster point. In these cases, the four value probabilities for the mark will be equal, since the distances from the mark to each of the ideal locations are equally large. The case when there is no mark associated with a raster point, i.e., the associated element contains zero marks, is treated as if there was a mark in the center of the raster point, that is the value probabilities are equal.

If there is more than one mark, for example three, associated with a raster point, i.e., three marks in the associated element, there are a total of 3×4 value probabilities for the raster point or element. The device is therefore arranged to determine, for each raster point or element and for each value, a value probability that the marks associated with the raster point together define this value (step E). These value probabilities for a raster point could thus also be called raster point probabilities. By calculating the value probabilities for the raster points, all the marks in the recorded image may be taken into consideration in the position determination and the risk of information being lost is minimized. Since the above means that for each element, value probabilities are calculated that the element defines each of the values, the values "0"-"3" are called element values in the rest of the description.

The value probabilities for an element can be determined by the value probabilities for the marks in the element being compared, the highest value probability being selected for each possible element value. Alternatively, the value probabilities for the element can be weighted sums of the value probabilities for each of the possible element values for the marks in the element. The value probabilities for the element can, of course, also be determined in other ways than those mentioned above.

Calculation of the value probabilities for an element in this example is illustrated by means of the number example in FIG. 6. FIG. 6a shows a raster point 22 with two associated marks 28 and 29. The marks 28 and 29 together constitute the element belonging to the raster point 22. The Tables 30 and 31 in FIG. 6b contain the value probabilities $P_1$ for the possible values of the respective marks. The Table 32 in FIG. 6c contains the resulting value probabilities $P_2$ for the possible element values of the element. In this example, the value probabilities for the element are relative. Alternatively, they can instead by normalized in a suitable way. If there is only one mark associated with a raster point, i.e., one mark in the associated element, the value probabilities for the mark and the element are obviously the same.

When recording an image, the distance from the device to the surface influences how large a part of the position code is recorded and thereby also how large a raster can be fitted to the image. For converting the image into a position, a predetermined number of elements is used, which in this example is 8×8 elements. If more than 8×8 raster points have been fitted to the image, an excess of elements is thus identified. The device is therefore further arranged to choose, from all the identified elements, the set of elements that provides the most information about the position on the surface (step F). This set of elements can be, but need not be, continuous. The elements in the set of elements correspond in this example to a raster point matrix with raster points fitted to the image, but this is not a requirement. In other words, the purpose is to select the elements with associated value probabilities for each element value which maximize an information measure for the recorded image. For this purpose, an entropy is calculated for each of the identified elements. Thereafter the 8×8 elements are chosen that give the smallest entropy sum, which corresponds to the maximum information measure for the recorded image. If the value probabilities for the elements are normalized so that $$\sum_i P_{2,i} = 1,$$

the entropy H for an element is calculated according to the following formula:

$$H = -\sum_i P_{2,i} \log_2(P_{2,i})$$

where $P_{2,i}$ is the value probability of the element for the element value i (i=0, 1, 2, 3) and where $\log_2$ is the two-logarithm. The entropy for an element is thus maximal when its value probabilities are equally high and minimal when all except one of the value probabilities are zero. An alternative to choosing 8×8 elements by means of entropy calculations is instead to use the highest value probability for each element as an information value. In this case, the continuous 8×8 elements are selected which maximize an information measure that consists of the sum of the information values for the 8×8 elements.

The coding pattern used in this example codes, as mentioned, two coordinates for a point on the surface 4. These coordinates are separately decodable. Therefore they can be called data in two dimensions. Each mark in the coding pattern codes more specifically a first bit which is used to decode the first coordinate and a second bit which is used to decode the second coordinate.

In the decoding of the coding pattern in the recorded image, each possible element value "0"-"3" for an element is therefore converted into a first and a second decoding value which in this example thus are binary. The device is thus arranged to convert, for each of the 8×8 elements in the set of elements, the element values "0"-"3" into the four different bit combinations (0, 1), (0, 0), (1, 0) and (1, 1). The bit combinations have the value probabilities belonging to the element values, for each element, see the continuation of the previous number example in Table 33 in FIG. 7a. In the bit combinations, the first bit, i.e., the first decoding value, refers to the first dimension and the second bit, i.e., the second decoding value, to the second dimension. The value probability $P_2$ for the corresponding element value is associated with the first and second decoding values. The set of elements can thus be used to create a first set of first decoding values with associated value probabilities for the first dimension, and a second set of second decoding values with associated value probabilities for the second dimension (step G). Table 33 describes an element in the set of elements. The Tables 33' and 33" contain the corresponding first decoding values in the first set with associated value probabilities and respectively the second decoding values in the second set with associated value probabilities. Each of the first and the second decoding values is, as is evident from that stated above, either a zero or a one.

The device is arranged to associate for each element in the set of elements each of the different possible first decoding values in the first set with one value probability, and each of the different possible second decoding values in the second set with one value probability. Since the possible first and second decoding values in this example are zero and one, the above results in one value probability for the decoding value zero and one for the decoding value one in the first and second sets for each element in the set of elements. In the following, the value probability for the decoding value zero is called zero probability and the value probability for the decoding value one is called one probability.

Referring to Table 33', in this example, the above is carried out for each of the elements in the set of elements by comparing the value probabilities in the first set that correspond to the first decoding value being a zero. Then the highest value probability is chosen as zero probability and is saved in a first matrix 34. In the same way, the value probabilities in the first set that correspond to the first decoding value being one, are compared. Then the highest value probability is chosen as one probability and is also saved in the first matrix 34. Referring to Table 33", the above procedure is subsequently repeated for the value probabilities in the second set, the second decoding values and a second matrix 35. The first and the second sets are thus used to create a first and second matrix with zero and one probabilities (step H). The result is illustrated in the continuation of the number example in FIG. 7b. Alternatively, a first and a second matrix with zero and one probabilities for the 8×8 elements in the set of elements are created by the value probabilities in the first set that correspond to the first decoding value being zero being added, the sum being stored as the zero probability, and by the value probabilities in the first set that correspond to the first number being one being added, the sum being stored as the one probability. The procedure is then repeated for the value probabilities in the second set and the second decoding values.

Thus the 8×8 elements in the set of elements now correspond to two matrices 34 and 35, each with 8×8 matrix elements, where each of the matrix elements contains one zero probability and one one probability. By means of these first and second matrices, coordinates can be determined for the position.

An alternative to choosing the set of elements after the determination of the value probabilities for all elements in the recorded image is to wait until matrices corresponding to the matrices 34 and 35 have been determined for all the identified elements. In this case, 8×8 matrix elements in each matrix can then be selected based on the corresponding zero and one probabilities. One way of doing this is to select 8×8 matrix elements in which one of the zero and one probabilities is high and the other low. In this case, the matrix elements corresponding to the same elements need not be selected for determination of both coordinates, the calculations proceeding with different corresponding elements for the two matrices.

In this example the position code is in the first dimension based on a first cyclic main number sequence. This gives a condition for the relation between the element values of the elements. The first cyclic main number sequence has the property that the place therein for each partial sequence of a predetermined length is unambiguously determined. In this example the predetermined length is 6. If thus 6 succeeding numbers are taken in an arbitrary place in the first cyclic main number sequence, these six numbers occur only once in the first main number sequence in this succession. The property also applies if the end of the first main number sequence is connected to the beginning of the first main number sequence. Therefore, the first main number sequence is called cyclic. In this example a binary main number sequence is used. If the place for a partial sequence with six numbers is to be unambiguously determined, the first main number sequence can then maximally have the length $2^6=64$ and the partial sequences of the length 6 can have places 0–63 in the first main number sequence. If, however, a first main number sequence of the length 63 is chosen, it is possible, as will be evident from the following, to provide improved error correction properties. In the following, it will thus be assumed that the length of the first main number sequence is 63 and that it thus defines unique places in the range 0–62.

Figures 8, 9:
FIG. 8 shows an exemplary cyclic main number sequence consistent with principles of the present invention.
FIG. 9 illustrates an exemplary calculation of a sequence probability consistent with principles of the present invention.

FIG. 8 shows an example of a first cyclic main number sequence 39 that can be used in connection with the position coding. The partial sequence 0,0,0,0,0,0 has, for instance, the unambiguous place 0, the partial sequence 1,1,1,1,1,0 the unambiguous place 9 and the partial sequence 1,1,1,0,1,0 the unambiguous place 11 in the first main number sequence. For determining a position on the surface, 6×6 elements must be identified in the recorded image. As discussed above, however, use is made of 8×8 elements for a position determination and the reason for this will be evident from the following. As stated above, the first cyclic main number sequence, on which the position code is based in the first dimension, has the property that it contains merely mutually unique partial sequences of the length 6. Consequently, also the place in the first cyclic main number sequence for each partial sequence of the length 8 is unambiguously determined. This fact it utilized in the determination of the coordinates for the position on the surface.

The device according to one implementation of the present invention is arranged to match each of the unique partial sequences of the length 8 in the first cyclic main number sequence with each of the columns in the first matrix 34 (step I). The method is illustrated in FIG. 9. The Figure shows an example of a binary partial sequence 36 of the length 8 and a column 37 in the first matrix 34 (FIG. 7b), such column having matrix elements which each contain a zero probability and a one probability corresponding to the first decoding value being zero and one, respectively. For each matrix element, one of the zero and one probabilities is selected depending on the corresponding number in the partial sequence 36. The first number in the partial sequence 36 is, for instance, zero, which means that the zero probability is selected for the first matrix element in the column 37. The second number in the partial sequence is one, which means that the one probability is selected for the second matrix element in the column 37. For each partial sequence in the first main number sequence, for each column in the first matrix 34, the device is in addition arranged to calculate a first sequence probability (step J) by multiplication of the correspondingly selected zero and the one probabilities for the matrix elements. In FIG. 9, the first sequence probability 38 corresponding to the partial sequence 36 and the column 37 has been calculated. After this operation, there will thus be 63 first sequence probabilities with a respective associated unique sequence value for each column in the first matrix 34. These sequence values are defined by the places of the corresponding partial sequences in the first cyclic main number sequence. The device according to this implementation of the present invention is arranged to select for each column the highest first sequence probability and the corresponding sequence value and save these.

The position code in the second dimension is here based on a second cyclic main number sequence which in this example has the same properties as the first cyclic main number sequence.

The device according to an implementation of the present invention is further arranged to match, in a manner corresponding to that above, each of the unique partial sequences of the length 8 in the second cyclic main number sequence with each of the rows in the second matrix 35. The rows in the matrix 35 have, just like the columns in the matrix 34, matrix elements which each contain one zero probability and one probability corresponding to the second decoding value being zero and one respectively. For each matrix element, one of the zero and one probabilities is selected depending on the corresponding number in a partial sequence in the second cyclic main number sequence. For each partial sequence in the second main number sequence, for each row in the second matrix 35, the device is further arranged to calculate a second sequence probability (step J) by multiplication of the correspondingly selected zero and one probabilities for the matrix elements. After this operation, there will thus be 63 second sequence probabilities with a respective associated unique sequence value for each column in the second matrix 35. These sequence values are defined by the places of the corresponding partial sequences in the second cyclic main number sequence. The device is further arranged to select for each row the highest second sequence probability and the corresponding sequence value and save these.

The position code used in this example is based on use of different rotations or circular shifts of the cyclic main number sequences. In order to code positions in, for instance, the x direction, the first main number sequence is printed or arranged in some other manner rotated or circularly shifted in different ways in columns across the surface, i.e., in the y direction orthogonally to the direction in which positions are to be coded, from above and down. The main number sequence may be printed repeatedly in the same column, which is necessary if more positions than what corresponds to the length of the main number sequence are to be coded in the y direction. The same rotation of the main number sequence is then used in all repetitions. This means that different rotations can be used in different columns.

Each pair of adjoining columns defines a difference number D. The difference number D is given by the difference between the places in the main number sequence for the first partial sequence in each column. If instead the difference between the places for the partial sequences is taken one step down in the columns, the result will be the same as the places will be offset in the same way. The difference number D will thus always be the same independently of at what "height" in the columns the places of the partial sequences in the main number sequence are compared. For each pair of columns, the difference number D is thus constant in the y direction. The difference numbers between adjoining columns form a set of difference numbers than can be used to obtain a coordinate for a position on the surface in the first dimension.

The position code in a second direction, for instance in the y direction in this case, can be based on the same principle as the position code in the first dimension. The second main number sequence is then arranged with different circular shifts in rows on the surface, i.e., in the x direction, from the left to the right. Difference numbers are defined between adjoining rows and these difference numbers form a set of difference numbers that can be used to obtain a coordinate for a position on the surface in the second dimension.

Thus the position code consists of one partial position code for the first direction and one partial position code for the second direction.

As is evident from that stated above, the partial sequences are not written with their explicit values, but with a graphical coding. In the graphical coding, marks define a superposing of the partial position codes.

Since the position code is based on main number sequences which are arranged in predetermined directions on the surface, the marks must be decoded in these directions for the position determination to be correct. The correct decoding directions are, as mentioned above, from above and down and from the left to the right.

Figure 10:
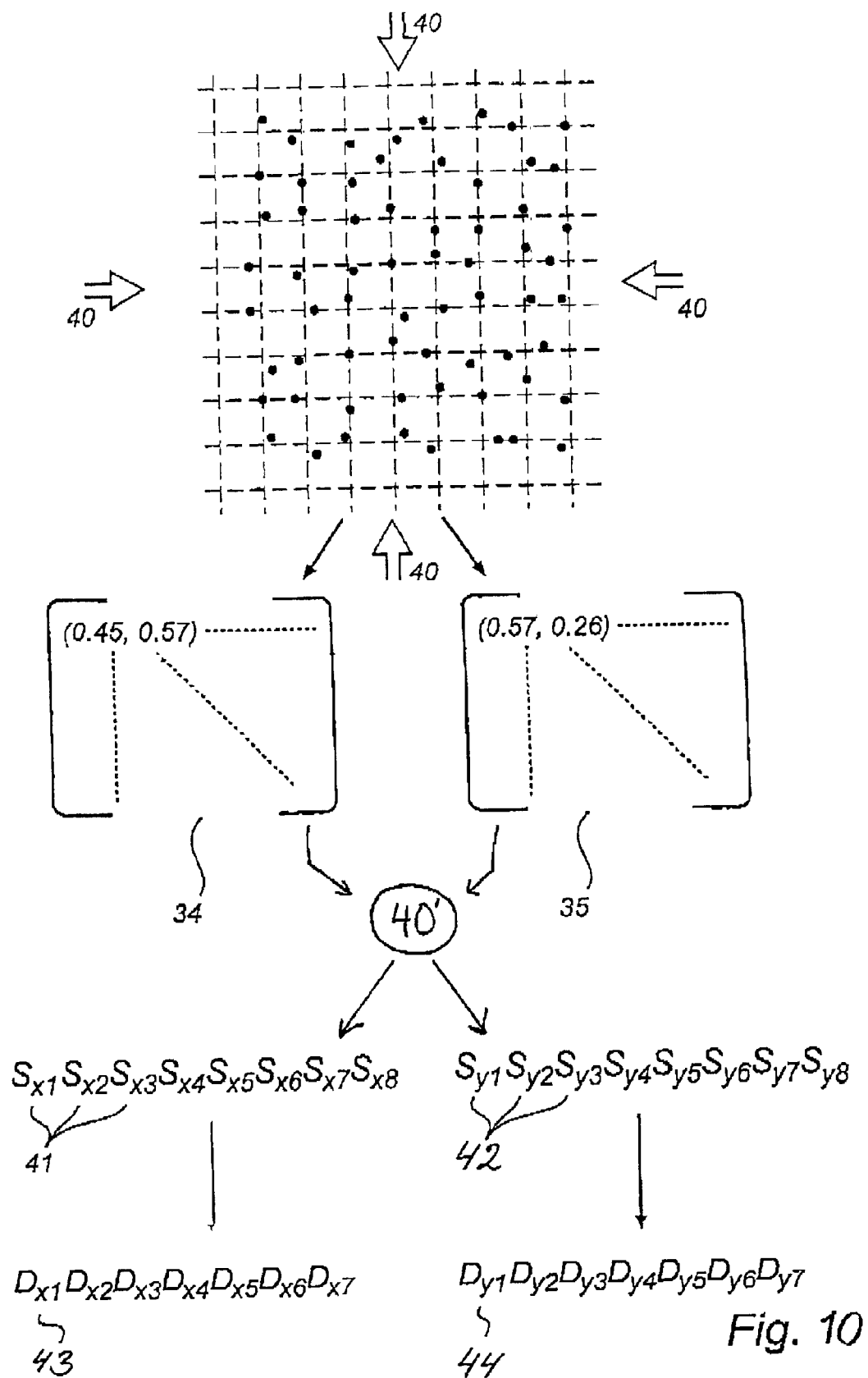
FIG. 10 illustrates exemplary steps in the decoding of data consistent with principles of the present invention.

The device 1 can, when recording an image, be held rotated in different locations relative to the surface and the position code. There are four possible recording rotations which are shown as arrows 40 in FIG. 10. The recorded image of the position code does not in itself reveal the relative rotation between the position code and the device since the position code has essentially the same appearance if it is rotated through 0, 90, 180 or 270 degrees. When the position code has been rotated, the direction of the displacement of each mark in relation to the raster point with which it is associated will, however, be changed. This results in turn in the bit combination (first decoding value, second decoding value) which codes the displacement of the mark being changed. With the "correct" rotation of the position code, the marks are arranged in the correct decoding directions from above and down in the columns as well as from the left to the right in the rows. If the correct rotation of the position is zero, the following applies to the incorrect rotations:

- 90 degrees clockwise: the columns with marks in the "correct" rotation, which marks are arranged from above and down, will be rows with marks arranged from the right to the left, i.e., in the incorrect decoding direction, and the rows with marks in the "correct" rotation, which marks are arranged from the left to the right, will be columns with marks arranged from above and down, i.e., in the correct decoding direction.
- 180 degrees: the columns with marks in the "correct" rotation will be columns with marks arranged from below and up, i.e., in the incorrect decoding direction, and the rows with marks in the "correct" rotation will be rows with marks arranged from the right to the left, i.e., in the incorrect decoding direction.
- 270 degrees clockwise: the columns with marks in the "correct" rotation will be rows with marks arranged from the left to the right, i.e., in the correct decoding direction, and the rows with marks in the "correct" rotation will be columns with marks arranged from below and up, i.e., in the incorrect direction.

If the marks in the columns and the rows are arranged in the incorrect decoding direction, the zero and one probabilities for each element will be inverted when decoded.

Therefore the device is arranged to test, as will be described below, different rotations of the partial area of the position code in the recorded image. The operation that was carried out on the first and the second matrix 34 and 35, respectively, i.e., the matching of the partial sequences in the cyclic main number sequences against columns and rows respectively in the matrices (step I), the calculation of sequence probabilities (step J), and the selection of the highest sequence probabilities with corresponding sequence values for the columns and the rows respectively, is carried out also on the first and the second matrix 34 and 35 rotated through 180 degrees and "inverted", which matrices in FIG. 7c are designated 34' and 35' respectively. These rotated, inverted matrices 34' and 35' correspond to an inverted version of the partial area of the position code in the recorded image. The reason for this is explained in FIG. 11 which shows an example of a partial area of a position code in a recorded image. In the Figure, only 9 marks are used for the sake of simplicity which are each associated with one raster point for the illustration. The position code 45 is the one recorded in the image. The position code 45' is the same position code inverted. The matrices 46 and 47 correspond to the matrices 34 and 35 respectively for the position code 45 turned the right way round, and the matrices 48 and 49 correspond to the matrices 34' and 35' respectively for the inverted position code 45'. If the matrices 48 and 49 for the inverted position code are rotated through 180 degrees and inverted, the matrices 46 and 47 will be obtained for the position code turned the right way around. By inversion is in this context meant that the zero and one probabilities in each matrix element change places.

After the above procedure, there is a highest sequence probability with a corresponding sequence value for each column in the matrices 34 ad 34', and for each row in the matrices 35 and 35'. For each of the matrices 34, 34', 35 and 35', the device is then arranged to calculate a rotation probability (step K) by multiplication of the corresponding highest sequence probabilities. Based on the sequence values corresponding to the highest sequence probabilities for that of the matrices 34 and 34' which corresponds to the highest rotation probability, and the sequence values corresponding to the highest sequence probabilities for that of the matrices 35 and 35' which corresponds to the highest rotation probability, coordinates for the position can be calculated.

As described above, it is not necessary to examine all four rotations. This is simply explained by means of an example. Now assume that the partial area of a position code in an image that is recorded is the one (45) shown in FIG. 11. Further assume that the "correct" rotation of the position code is rotated through 90 degrees clockwise relative to the recorded one. According to the above description, where the correct rotation is assumed to correspond to a rotation through 0 degrees, this means that the position code 45 in the recorded image is rotated through 270 degrees clockwise relative to the "correct" rotation. Consequently, the position code 45' is rotated through 90 degrees clockwise relative to the "correct" rotation. In the manner described above, the position codes 45, 45' are now decoded in FIG. 11. The columns with marks in the "correct" rotation through 0 degrees are, as described above, arranged in the correct decoding direction in the position code 45. The correct direction causes the sequence probabilities, and consequently the rotation probability, corresponding to these rows, to be high. The rows with marks in the correct rotation are, as described above, columns arranged in the incorrect decoding direction in the position code 45. The incorrect direction combined with the inversion causes the value probabilities, and consequently the rotation probability, corresponding to these columns, to be low. The relationship will be the opposite for the position code 45'. The columns with marks in the correct rotation through 0 degrees are, as described above, rows arranged in the incorrect decoding direction in the position code 45'. The incorrect direction causes the sequence probabilities, and consequently the rotation probability, corresponding to these rows, to be low. The rows with marks in the correct rotation are, as described above, columns arranged in the correct decoding direction in the position code 45'. The correct direction causes the sequence probabilities, and consequently the rotation probability, corresponding to these columns, to be high.

When recording the "correct" rotation of the position code, columns and the rows will, as mentioned above, extend in the "correct" direction in the image. This means for the example in FIG. 7 that the rotation probabilities for the matrices 34 and 35 will both be higher than the rotation probabilities for the matrices 34' and 35'. This is an indication that the "correct" rotation of the position code has been recorded. Thus, a first coordinate can be calculated based on the sequence values corresponding to the highest sequence probabilities for the matrix 34, and a second coordinate can be calculated based on the sequence values corresponding to the highest sequence probabilities for the matrix 35.

When recording the position code rotated through 180 degrees in relation to the "correct" rotation, the columns and the rows will extend in the "incorrect" direction in the image. This means for example in FIG. 7 that the rotation probabilities for the matrices 34' and 35' will both be higher than the rotation probabilities for the matrices 34 and 35. This is an indication that the position code has been recorded in the rotation through 180 degrees in relation to the "correct" rotation. Thus, a first coordinate can be calculated based on the sequence values corresponding to the highest sequence probabilities for the matrix 34', and a second coordinate can be calculated based on the sequence values corresponding to the highest sequence probabilities for the matrix 35'.

Recording of the position code rotated through 90 or 270 degrees clockwise in relation to the "correct" rotation is indicated by the highest rotation probabilities not belonging to the same rotation. If it is assumed that the matrices 34 and 35 in FIG. 7 originate from a position code which is rotated through 90 degrees clockwise in relation to the correct direction, the rotation probability for the matrix 34 will be higher than the rotation probability for the matrix 34', and the rotation probability for the matrix 35 will be lower than the rotation probability for the matrix 35'. In this case, the second coordinate is calculated based on the sequence values corresponding to the highest sequence probabilities for the matrix 34, and the first coordinate is calculated based on the sequence values corresponding to the highest sequence probabilities for the matrix 35'. If it is assumed instead that the matrices 34 and 35 in FIG. 7 originate from a position code which is rotated through 270 degrees clockwise in relation to the correct direction, the second coordinate is instead calculated based on the sequence values corresponding to the highest sequence probabilities for the matrix 34', and the first coordinate is calculated based on the sequence values corresponding to the highest sequence probabilities for the matrix 35.

What allows the detection of the rotation of the position coding in the recorded image thus is the fact that the rotation probability for a matrix is changed when the matrix is rotated through 90, 180 or 270 degrees. If the rotation of the position code is different from zero, i.e., if the rotation of the position code in the recorded image is incorrect, the rotation probability as stated above will be low. This depends on the fact that the unique partial sequences of the length 8 in the cyclic main number sequences do not occur inverted or reverse in the main number sequences. If such a condition should be satisfied for the main number sequences for partial sequences of the length 6, it would mean that the main number sequences would be reduced significantly, which in turn would imply that fewer positions could be coded. This is thus one reason why 8×8 elements are used for the position determination although only 6×6 are theoretically required.

The same basic principles as the ones used in the rotation detection can be used for error correction. For instance, the main number sequence can be selected so that partial sequences of a predetermined length, which is longer than the one required for position determination, do not occur with one bit inverted in the main number sequence. Then, if all bits except one in such a longer partial sequence can be detected with certainty, the incorrect bit can be corrected. This is another reason why 8×8 elements are used for the position determination although only 6×6 are theoretically required.

Thus, by an intelligent selection of the main number sequence, the error detection and error correction properties of the coding pattern can be considerably improved.

The property of the cyclic main number sequences that partial sequences of the length 8 do not occur inverted or reverse can, however, not be provided for a 64 bit long main number sequence, which is the reason why the length of the main number sequences has instead been selected to be 63.

In decoding, redundant information is thus used to obtain error correction properties. In the example described above, 8×8 elements are used in the decoding, although the position information can be extracted based on 6×6 raster points, i.e., there is 56 bit redundant information $[(8^2-6^2)\times 2]$ for determining the position. In decoding, information in the current image is matched, by columns and by rows, with the different partial sequences that may occur in the position code, while using the value probabilities belonging to the current image. The combination of redundant information, probabilities and a known condition for the relation between the values of the elements gives good insensitivity to interference in the current image. The value of each individual mark thus decreases in importance since the value of the individual mark must correspond to the other values in that of the partial sequences which gives the highest sequence probability.

If the need for error correction is more limited, the device can alternatively be arranged to directly select, for each of the columns in the first matrix, and for each of the rows in the second matrix, a sequence, and thus a sequence value, corresponding to the highest of the zero and one probability for each element.

When the rotation 40' of the recorded position code in relation to the "correct" rotation has been established, the first and second coordinate of the position can thus be determined (step L). This is carried out as described above, based on sequence values which in FIG. 10 are designated $Sx_1-Sx_8$ (41) for the first coordinate and $Sy_1-SY_8$ (42) for the second coordinate.

The device is arranged to calculate for the sequence values $Sx_1-Sx_8$ and $Sy_1-Sy_8$ differences between adjacent sequence values, which results in two sets, 43 and 44, of seven difference numbers $Dx_1-Dx_7$ and $Dy_1-Dy_7$ each. These difference numbers are then used to generate a first coordinate and a second coordinate.

For the calculation of the first coordinate, however, only six of the sequence values $Sx_1-Sx_8$, i.e., five of the difference numbers $Dx_1-Dx_7$, are necessary as described above. According to this example, the sequence values $Sx_2-Sx_7$ and thus the difference numbers $Dx_2-Dx_6$ are used. The same applies to the second coordinate that is then calculated from the sequence values $Sy_2-Sy_7$ and thus the difference numbers $Dy_2-Dy_6$. Alternatively, only six sequence values are determined for each direction, $Sx_2-Sx_7$ and $Sy_2-Sy_7$.

The conversion from difference numbers to coordinates can be carried out in many ways, for example in the way that is described in Applicant's applications WO 01/26033 and SE 0103589-8 which are herewith incorporated by reference.

In the example described above, 8×8 elements have been identified, for data decoding, in a recorded image. However, it may sometimes happen that it is not possible to identify so many elements. "Empty" additional elements are then added to the elements that can be identified in the image to obtain a total of 8×8 elements. As described earlier, the value probabilities for an "empty" element are all equal.

FIG. 12 shows a sheet of paper which has a surface 50 that is provided with an alternative position code 51 which consists of marks 52 and which for the sake of clarity is greatly enlarged. In this case, the value of the marks 52 is defined by their size. This type of position code is described in Patent Publication WO 00/79383, which is herewith incorporated by reference.

In this case, the device is arranged, just as described above, to record an image of a partial area of the position code, to identify a plurality of marks in the image, and to fit a raster to the image so that each of the marks is associated with a raster point. Like in the case with the above position code, the marks associated with a raster point constitute an element belonging to the raster point. There are two possible values for each mark. The small mark 53 corresponds to the value zero and the large mark 54 corresponds to the value one, and there is an ideal size of the small and large marks.

The identified marks are usually not of an ideal size. In many cases, it can therefore be difficult to unambiguously determine a value for each mark 52. The device is therefore arranged as above to calculate, for each identified mark, an associated value probability for each value "0" and "1" that the mark defines this value.

The size of the marks 52 may be assumed to be normally distributed around the ideal sizes, which means that the value probabilities P(r) can be calculated by the formula $P(r)=k \exp(-(R_i-r)^2/v)$, where k=a constant, $R_i$=ideal size, r=size of a mark and v=a constant, in this example the variance of the size. $R_i$ and r can be, for instance, areas or radii. The variance can be determined empirically.

Thus, for each mark, two value probabilities can be calculated. The case in which there is no mark associated with a raster point, i.e., the associated element contains zero marks, is dealt with as if there were two marks of the ideal size, one with the value "0" and one with the value "1", associated with the raster point.

If there is more than one mark, for example three, associated with a raster point, i.e., three marks in the associated element, then there are a total of 3×2 value probabilities for the raster point or element. The device is therefore arranged as above to determine, for each raster point or element and for each value, value probabilities that the marks associated with the raster point together define this value. For each element, value probabilities are thus calculated that the element defines each of the values, and therefore the values "0" and "1" can also in this case be called element values.

The value probabilities for an element can be determined, as above, by the value probabilities for the marks in the element being compared, the highest value probability being selected for each element value. Alternatively, the value probabilities for the element can be weighted sums of the value probabilities for the element values for the marks in the element. In the case of this position code, the value probabilities for the element can, of course, also be determined in other ways than those mentioned above.

Also in this case, the value probabilities for a mark and an element are the same if the element only contains that mark.

Like with the position code described by way of introduction, the value probabilities for the elements are then used to determine a position on the surface in a manner corresponding to that described in detail above.

One alternative as regards the latter position code is to let the value probabilities to be a function of the total dark area corresponding to a raster point. This alternative could be useful if there is only one mark associated with each raster point. Sometimes it may in fact happen that for some reason a mark in a recorded image of the position code is not a completely continuous area. Then there is a risk that the mark appears to be split and thus, is perceived by the device as several marks.

In the above described examples, probabilities have been multiplied on several different occasions to obtain various results. It can be pointed out that in cases in which the probabilities that are to be multiplied are described by exponential functions, logarithms can be used, so that the results are obtained instead by summing up exponents according to the following formula.

$$\ln(exp(a)\cdot exp(b))=\ln(exp(a))+\ln(exp(b))=a+b$$

FIGS. 13*a* and *b* show two additional types of codes that can be used in connection with the present invention. The code 55 in FIG. 13*a* consists of marks 56 in the form of small lines. The values of the marks 56 depend upon the inclination of the lines. The mark 57 corresponds to the value zero and the mark 58 corresponds to the value one. This type of code is described in the application U.S. Pat.

No. 5,245,165, which is herewith incorporated by reference. The code 59 in FIG. 13b consists of a square grid 60, with triangles 61 being placed in the squares. The square 62 has the value zero and the square 63 has the value one.

Another code that can be used in connection with the present invention consists of marks that have two different ideal shapes, a first and a second ideal shape, with the density of the marks on a surface providing information about the position. In this case, the density varies in two dimensions, the density of marks with a first ideal shape varying in a first dimension and the density of marks with a second ideal shape varying in a second dimension.

There are a plurality of other codes that can be used in connection with the present invention, the variants described above only being regarded as examples.

When an image of a partial area of a position code has been recorded, the marks are identified by dark continuous areas in the image being searched out. It is, however, the case that the dark continuous areas in the image are not necessarily marks in the position code. There are sometimes impurities, for instance in the form of dust, on the surface on which the position code is printed. These impurities cause noise marks in the recorded image, which noise marks may then by mistake be identified as marks in the position code. Also sensor noise may cause noise marks in the recorded image. Noise marks in the recorded image may also originate from a defect on one of the components in the device, for instance damaged pixels in the sensor.

In the first case, in which the values of the marks are determined based on their distance from the ideal locations, there is however a factor that prevents any noise marks from having an effect on the result of the position determination. If a good fit of a raster has been made for the recorded image, the noise marks will be located at a greater distance from the ideal locations than the marks of the position code. In the second case, there is another factor that prevents the noise marks from having an effect on the result. The noise marks are usually much smaller than the marks of the position code. When determining the value probabilities for an element, the value probabilities for the noise marks will thus be of less importance since they are much lower than those for the marks of the position code.

A person skilled in the art will recognize that the above examples can be varied in a number of ways without departing from the concept of the invention.

There are two different parameters for the marks in the position codes that have been discussed in this application, namely the location of the marks and their shape/size. Depending upon which position code is used, one of the parameters will indicate the value of the marks. The other parameter can then suitably be used to calculate a probability of the identified mark being a mark in the position code.

In the case of the position code in which the value of the marks is defined by their location in relation to a raster, for example, the area of the marks can correspond to a mark probability, which indicates the probability that a current mark is really a mark in the position code. The value probabilities for each mark can then be multiplied by its mark probability before the raster point probabilities are calculated. An alternative to this method is that a form of area filter is used in the device to remove the noise marks completely at an early stage. This filter acts in such a way that all marks that have an area that lies between two limit values are identified as marks in the position code, while all marks outside the limit values are rejected.

In the case of the position code in which the value of the marks is defined by their shape/size, for example, the location of the marks in relation to a raster can instead indicate the probability that a mark is a mark in the position code.

It would of course also be possible to use the invention in connection with position determination in a single dimension. In the case of the position code discussed by way of introduction, this would mean that one of said first and second sets would be used to determine in the manner described above a first or a second coordinate for the position.

The invention is not limited to use in connection with position codes that are based on binary number bases. Of course also other number bases can be used to express the cyclic main number sequences, as well as the element values in the first and the second decoding values.

Moreover, the invention is not limited to use in connection with position codes where the elements assume two or four element values. In one alternative, the elements may instead assume eight element values. Each element value may then be converted into a first, a second and a third decoding value for each of three dimensions. Consequently also a third set and a third matrix may be created for a third dimension. This could be used, for instance, to determine a position in three dimensions.

The device and the method according to the present invention are not limited to use in connection with coding of positions, but can also be used in other situations, for example when decoding data stored in the form of a code on a base, as described in Patent Application WO 01/71653, which has been assigned to the present applicant and which is herewith incorporated by reference.

What is claimed is:

1. A method for decoding data stored in a partial area of a coding pattern on a surface, based on a recorded image of the partial area, said coding pattern containing elements which each have at least two possible decoding values, said method comprising:
   identifying in the image a plurality of said elements;
   calculating, for each identified element, an associated value probability for each possible decoding value that the element has this decoding value; and
   performing the decoding of data based on the decoding values and the corresponding value probabilities.

2. A method as claimed in claim 1, wherein the decoding of data comprises determining a coordinate for a point on the surface.

3. A process as claimed in claim 1, wherein the decoding of data comprises determining two coordinates for a point on the surface.

4. A method as claimed in claim 1, wherein the decoding of data comprises decoding at least a first set of decoding values for a predetermined number of the identified elements.

5. A method as claimed in claim 4, comprising calculating, by means of the value probabilities for the first set of decoding values, a sequence probability for each of a plurality of permissible combinations of decoding values, each sequence probability indicating the probability of a sequence of elements in the recorded partial area of the image having said combination of decoding values.

6. A method as claimed in claim 5, wherein the permissible combinations are determined by a cyclic main number sequence, which contains only mutually unique partial sequences of a predetermined length, each partial sequence corresponding to one of the permissible combinations.

7. A method as claimed in claim 6, wherein the partial sequences and the cyclic main number sequence are such that no partial sequence is present in the cyclic main number sequence in inverted and reversed form.

8. A method as claimed in claim 5, wherein the decoding of data is performed based on rotation probabilities, which correspond to different rotations of the recorded image and which are defined based on the sequence probabilities.

9. A method as claimed in claim 8, wherein the decoding of data is performed based on the rotation of the recorded image which corresponds to the highest rotation probability.

10. A method as claimed in claim 4, further comprising selecting, for each of the elements corresponding to the first set of decoding values, the decoding value which has the highest associated value probability, and carrying out the decoding of data based on the selected decoding values.

11. A method as claimed in claim 4, further comprising selecting, for each of the elements corresponding to the first set of decoding values, one of the possible decoding values based on a condition, given by the coding pattern, for the relation between the decoding values of the elements.

12. A method as claimed in claim 11, wherein said condition indicates permissible combinations of the decoding values for the elements corresponding to the first set.

13. A method as claimed in claim 12, comprising carrying out the decoding of data based on sequence probabilities, a sequence probability for a sequence of elements being defined based on the value probabilities for the decoding values for the sequence that correspond to one of the permissible combinations.

14. A method as claimed in claim 13, comprising carrying out the decoding of data based on the decoding values for the sequence that give the highest sequence probability.

15. A method as claimed in claim 4, wherein each element has at least two possible decoding values for each of two separately decodable dimensions of data, the decoding values of the first set including the possible decoding values for the first dimension of data.

16. A method as claimed in claim 15, wherein each element has at least four possible element values, which correspond to different combinations of a possible decoding value of the first dimension and a possible decoding value of the second dimension, further comprising calculating, for each identified element, an associated value probability for each possible element value that the element has this element value.

17. A method as claimed in claim 16, further comprising dividing each of the possible element values for the elements corresponding to the first set into a first possible decoding value for the first dimension and a second possible decoding value for the second dimension and associating with each of these decoding values the value probability of the element value.

18. A method as claimed in claim 17, wherein the division of the possible element values takes place by the element value being expressed as two numbers in a number base which is smaller than the number base in which the element value is expressed.

19. A method as claimed in claim 16, wherein each of the identified elements comprises at least one mark and the value probabilities of the element values are calculated based on the size of the marks in relation to a number of ideal sizes $R_i$ of the marks.

20. A method as claimed in claim 19, wherein the value probabilities of the element values, for each of the ideal sizes $R_i$, is a function of $\exp(-(R_i-r)^2/v)$ where r is the size of the mark and v is a constant.

21. A method as claimed in claim 17, further comprising assigning, if the division of two of the possible element values for an element results in two identical possible decoding values for one dimension of data, the possible decoding value the highest of the value probabilities assigned to these element values.

22. A method as claimed in claim 16, wherein each of the identified elements comprises at least one mark, which is associatable with one reference point of a number of reference points in a reference system, and wherein the value probabilities of the element values are calculated based on the location of the marks in relation to the reference points with which they are associated.

23. A method as claimed in claim 22, wherein the value probabilities are defined by the distance of the marks to each of a number of ideal locations belonging to the reference points with which they are associated.

24. A method as claimed in claim 23, wherein the value probabilities for each mark, for each of the distances $d_i$, are a function of $\exp(-(d_i)^2/v)$ where v is a constant.

25. A method as claimed in claim 22, wherein the reference system is a raster and the reference points are raster points, which each correspond to an intersection in the raster.

26. A method as claimed in claim 16, wherein the elements corresponding to the first set are selected based on a maximizing of an information measure for the first set, said information measure being defined based on the value probabilities for the element values of the elements corresponding to the first set.

27. A method as claimed in claim 4, wherein the decoding of data further comprises decoding a second set of decoding values for a predetermined number of the identified elements.

28. A method as claimed in claim 27, wherein the decoding values in the second set include the possible decoding values for the second dimension of data, further comprising the step of assigning each decoding value in the second set a value probability which indicates the probability of the corresponding element having this decoding value.

29. A method as claimed in claim 27, wherein the decoding values and their associated value probabilities for the second set of decoding values are determined in the same manner as the decoding values for the first set, and the decoding of the second set of decoding values is carried out in the same way as the decoding of the first set of decoding values.

30. A method as claimed in claim 1, wherein the decoding of data is performed based on rotation probabilities, which correspond to different rotations of the recorded image and which are defined based on the value probabilities associated to the decoding values of the identified elements.

31. A method as claimed in claim 1, wherein each element has at least two possible element values, which are identical with the possible decoding values of the element, and wherein each element value has an associated value probability which is identical with the value probability of the decoding value.

32. A device for decoding data which is stored in a partial area of a coding pattern on a surface, based on a recorded image of the partial area, which coding pattern contains elements, which each have at least two possible decoding values, said device comprising:
   a processing unit which decodes data by
   identifying in the image a plurality of said elements,
   calculating for each identified element an associated value probability for each possible decoding value that the element defines this decoding value, and
   carrying out the decoding of data based on the decoding values and the corresponding value probabilities.

33. A device for data decoding as claimed in claim 32, said device being adapted to decode at least a first set of decoding values for a predetermined number of the identified elements.

34. A device for data decoding as claimed in claim 33, said device being adapted to calculate, by means of the value probabilities for the first set of decoding values, a sequence probability for each of a plurality of permissible combinations of decoding values, each sequence probability indicating the probability that a sequence of elements in the partial area of the recorded image has said combination of decoding values.

35. A device for data decoding as claimed in claim 33, said device being adapted to select, for each of the elements corresponding to the first set of decoding values, one of the possible decoding values based on a condition, given by the coding pattern, for the relation of the decoding values of the elements.

36. A device for data decoding as claimed in claim 32, adapted to carry out the decoding of data based on rotation probabilities, which correspond to different rotations of the recorded image and which are defined based on the value probabilities associated to the decoding values of the identified elements.

37. A memory medium on which is stored a computer program with instructions which, when executed by a processor, perform a method of decoding data which is stored in a partial area of a coding pattern on a surface, based on a recorded image of the partial area, which coding pattern contains elements, which each have at least two possible decoding values, said method comprising:identifying in the image a plurality of said elements;

calculating, for each identified element, an associated value probability for each possible decoding value that the element has this decoding value; and performing the decoding of data based on the decoding values and the corresponding value probabilities.

* * * * *